United States Patent [19]

Vink

[11] Patent Number: 5,553,308

[45] Date of Patent: Sep. 3, 1996

[54] SERIAL COMMUNICATION FORMAT AND METHODOLOGY

[75] Inventor: Nelson J. Vink, Garland, Tex.

[73] Assignee: Alcatel Network Systems, Inc., Richardson, Tex.

[21] Appl. No.: 26,601

[22] Filed: Mar. 5, 1993

[51] Int. Cl.⁶ .................................................. G06F 13/42
[52] U.S. Cl. ..................... 395/853; 395/200.17; 395/286
[58] Field of Search ..................................... 395/725, 325, 395/853, 200.17, 200.18, 286; 370/85.1, 99, 70, 105.1, 110.1, 110.4

[56] References Cited

U.S. PATENT DOCUMENTS

| | | | |
|---|---|---|---|
| 3,855,422 | 12/1974 | Cadiou et al. ............................. | 179/15 |
| 4,204,093 | 5/1980 | Yeh ............................................ | 370/95 |
| 4,451,886 | 5/1984 | Guest et al. .............................. | 395/325 |
| 4,577,317 | 3/1986 | Chu et al. ............................. | 370/110.1 |
| 4,599,723 | 7/1986 | Eck ............................................ | 371/47 |
| 4,601,586 | 7/1986 | Bahr et al. ................................ | 370/94 |
| 4,683,530 | 7/1987 | Quatse ..................................... | 395/853 |
| 4,701,913 | 10/1987 | Nelson ................................. | 370/110.1 |
| 4,803,685 | 2/1989 | Oget .......................................... | 371/33 |
| 4,817,146 | 3/1989 | Szczutkowski et al. .................. | 380/48 |
| 4,872,003 | 10/1989 | Yoshida ............................. | 340/825.08 |
| 4,885,744 | 12/1989 | Lespagnol et al. ......................... | 370/94 |
| 4,896,261 | 1/1990 | Nolan ..................................... | 395/325 |
| 4,907,254 | 5/1990 | Suzuki et al. ............................. | 379/93 |
| 5,050,189 | 9/1991 | Cox et al. .................................. | 375/39 |
| 5,163,136 | 11/1992 | Richmond ............................... | 395/275 |
| 5,173,900 | 12/1992 | Miller et al. ......................... | 370/110.1 |
| 5,182,746 | 1/1993 | Hurlbut et al. ....................... | 370/100.1 |
| 5,208,805 | 5/1993 | Ochiai ...................................... | 370/60 |
| 5,258,999 | 11/1993 | Wernimont et al. ........................ | 375/7 |
| 5,287,458 | 2/1994 | Michael et al. ......................... | 395/250 |
| 5,287,463 | 2/1994 | Fram et al. ............................. | 395/325 |
| 5,323,149 | 6/1994 | Hoult et al. ........................ | 340/825.54 |
| 5,335,369 | 8/1994 | Aisaka .................................. | 455/116 |
| 5,353,284 | 10/1994 | Shiobara ................................ | 370/85.1 |
| 5,367,544 | 11/1990 | Bruekheimer ........................... | 375/116 |
| 5,375,119 | 12/1994 | Koivu ....................................... | 370/82 |
| 5,375,171 | 12/1994 | Dewolf et al. ............................ | 380/49 |
| 5,436,892 | 7/1995 | Tago et al. ................................ | 371/60 |
| 5,442,637 | 8/1995 | Nguyen .................................. | 371/5.5 |

Primary Examiner—Ayaz R. Sheikh
Attorney, Agent, or Firm—Vinson & Elkins L.L.P.

[57] ABSTRACT

A method of communicating serial information from a source to a destination is disclosed. In one embodiment, the method involves numerous steps for communicating serial information from a source to a destination. First, transmission is commenced of a serial stream of status information from the source to the destination, wherein the serial stream of status information has a beginning, an end, and a plurality of serially ordered status units between the beginning and end. Second, after the first step, a serial stream of control information is transmitted from the source to the destination, wherein the serial stream of control information has a beginning and an end. Various receiving steps then follow. First, the destination receives the beginning and a first portion of the plurality of status units of the serial stream of status information. Second, the destination receives the serial stream of control information. Third, the destination receives a second portion of the plurality of status units and the end of the serial stream of status information, wherein the status and control streams are communicated from the source to the destination along the same medium. Various alternative embodiments are also described.

10 Claims, 2 Drawing Sheets

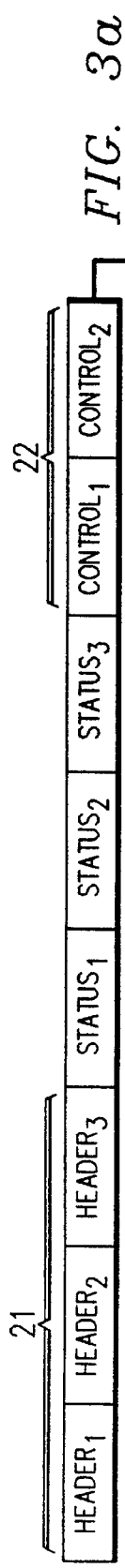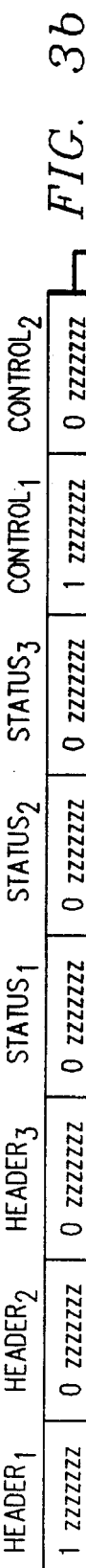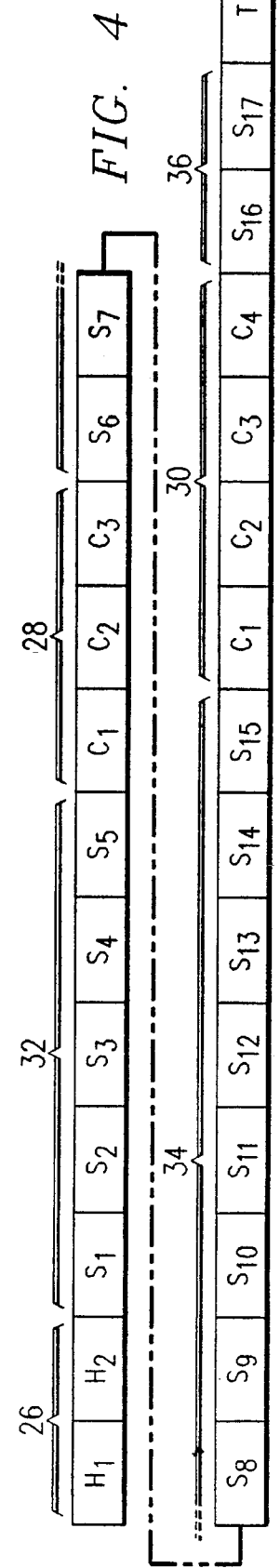

SERIAL COMMUNICATION FORMAT AND METHODOLOGY

This invention relates in general to serial communications, and more particularly to a system and methodology for integrating a second type of serial information into the communication of a first type of serial information.

BACKGROUND OF THE INVENTION

Serial communication of information has long existed in many digital applications. For example, many computer networks include a number of stations connected to a serial network, where each of the stations communicates serial information to other stations along the network. Moreover, some systems communicate serial information over different types of media. For example, digitized serial telephone signals are commonly communicated over contemporary fiber optic systems. As another example, digital radio transceivers communicate serial information by converting the serial data stream into an RF signal for transmission/receipt between communicating transceivers. Numerous other examples of serial communication are readily appreciated by a person having skill in the art.

FIG. 1 illustrates a typical prior art format for communicating serial information between two devices (irrespective of the communication medium used by the devices). Specifically, FIG. 1 illustrates a sequence of bytes commencing with a stream of HEADER bytes followed by a stream of DATA bytes. Typically, the number of HEADER bytes (shown as M) is considerably less than the number of DATA bytes (shown as N). As known in the art, the HEADER bytes typically present information concerning the upcoming DATA bytes; however, the HEADER bytes may provide some type of communication control that does not relate to the upcoming DATA bytes. The information provided by the HEADER byte may directly occur from the bits of the byte or, alternatively, may provide an address for determining the functions performed in response to the byte.

The first HEADER byte (shown as HEADER$_1$) is known as a header identification byte. The header identification byte often indicates the total number of HEADER bytes in the HEADER stream. This indication may be provided directly by the lead HEADER byte, that is, by dedicating a certain number of bits to give a binary representation of the number of HEADER bytes. For example, three bits in HEADER$_1$ could be set aside to indicate that the HEADER stream includes anywhere from one to eight (i.e., $2^3=8$) HEADER bytes. As an alternative, the header identification byte may provide an address or indication of a look-up feature which, upon consulting a look-up table, indicates the number of subsequent HEADER bytes. In either instance, once the number of HEADER bytes are known, a count increments (or decrements) until the byte count is satisfied, thereby indicating that the end of the HEADER byte stream has been received. Note also that the HEADER identification byte may itself indicate a control function to be performed, either in addition to, or in lieu of, identifying the number of immediately following HEADER bytes.

Although not shown, a TRAILER byte may immediately follow the sequence of HEADER bytes (i.e., HEADER$_1$ through HEADER$_M$). This TRAILER byte may be used to indicate the end of the HEADER sequence, and also may provide error correction information pertaining to the HEADER sequence.

The DATA bytes of FIG. 1 terminate with a last DATA byte of information (i.e., DATA$_N$). As known in the art, one technique for defining such a termination is including a TRAILER byte which immediately follows the end of the stream of DATA bytes. The TRAILER may include error correction information, such as parity or the like. Although shown as a single byte, such information may comprise more than one byte. An alternative technique for terminating a DATA stream simply provides a fixed number of DATA bytes. This fixed number is typically embedded in the HEADER bytes, or is established under a specified protocol. Thus, a device receiving a stream of bytes may receive and decode the byte count, thereby indicating how many DATA bytes will follow the HEADER bytes. Consequently, as each DATA byte is received, a count increments (or decrements) until the byte count is satisfied, thereby indicating that the end of the DATA byte stream has been received.

FIG. 2 illustrates a block diagram of an example of devices which communicate serial information between one another. Particularly, FIG. 2 illustrates a first and second transceiver indicated at 10a and 10b, respectively. For purposes of FIG. 2, transceivers 10a and 10b are assumed to be identical in structure. Accordingly, for explanatory purposes, the designation "a" is used for each component described with respect to transceiver 10a, while the designation "b" is used for each like-component described with respect to transceiver 10b. Thus, the structural description set forth below with respect to transceiver 10a applies equally to transceiver 10b. Note that transceivers 10a and 10b are vastly simplified for purposes of exemplifying the present invention in a given context and, hence, should be understood to include numerous other components as known in the art.

Transceiver 10a includes a controller 12a for digital signal processing, as well as for controlling various components within transceiver 10a. As known in the art, transceiver 10a includes both a transmitter 14a and a receiver 16a. Specifically, controller 12a is coupled to provide digital signals to a digital-to-analog (D/A) conversion circuit 18a. D/A conversion circuit 18a converts the digital signals, and provides the resulting analog signals to transmitter 14a. Transmitter 14a includes known amplifier circuitry, and is coupled to an antenna 19a for transmitting radio signals to transceiver 10b. Antenna 19a is also coupled to provide analog signals it receives to receiver 16a. Receiver 16a is coupled to an analog-to-digital (A/D) conversion circuit 20a. A/D conversion circuit 20a converts the analog signals, and provides the resulting digital signals to controller 12a.

Transceivers such as transceiver 10a and 10b may be used in a multitude of applications. One example is communicating telephone signals as in the telecommunications art. For example, a pair of transceivers may dedicate one channel to communicate known voice signals, such as in a DS3 format. As known in the art, a DS3 format communicates 672 DS1 signals (e.g., a DS1 is a typical voice line, such as that from a single telephone).

In addition to voice signals, known transceivers communicate so-called overhead data between one another. Overhead data is communicated between transceivers on a channel independent of the channel communicating the DS3 format signals. The overhead data includes status (or performance) data pertaining to the transceivers. This status data may be transmitted as a sequence of DATA bytes as described in connection with FIG. 1, above. For example, transceiver 10a may communicate performance data to transceiver 10b indicating that transceiver 10a includes alarm functionality. Other examples of status data include the status of various functions of a transceiver, such as whether a particular channel is on-line or off-line, or whether a particular alarm has been activated, et cetera. The ability to communicate this status data is helpful because a person located at transceiver 10a can obtain status data pertaining to transceiver 10b without having to travel to the often remote location of transceiver 10b.

The overhead data also includes control data. This control data is used for activating a function or operation at the receiving transceiver. For example, control data may be used to switch a relay connected to the receiving transceiver. Accordingly, equipment (e.g., air conditioner) may be connected to this relay and, hence, controlled from a remote distance by the transmitting transceiver. The control data, like the status data, may also be transmitted as the DATA bytes described in connection with FIG. 1, above. Note, however, in the prior art, only a single stream of either status or control may be transmitted at one time. Thus, in the prior art, the DATA bytes for a given overhead stream are either all status DATA, or are all control DATA.

Note that each of the communicated signals described above may be simultaneously bi-directional. Thus, while transceiver 10a transmits a DS3 signal to transceiver 10b, transceiver 10b may simultaneously transmit a different DS3 signal back to transceiver 10a. Typically, these simultaneous transmissions are accomplished over different frequencies so as to avoid interference with one another. Note that the overhead data (i.e., status and control) also may be simultaneously communicated between transceivers.

For transceivers used in telecommunications applications, it has become known to include an automatic power control (APC) function between transceivers. The APC function operates such that a receiving transceiver senses the voltage level of the signals (both voice and overhead) it receives from a transmitting transceiver. If the voltage level approaches an unacceptably low value, the receiving transceiver communicates an APC control signal to the transmitting transceiver. The APC control signal adjusts the amplifier gain control (e.g., a given value of dB) on the transmitting transceiver. Because the signal is a control signal, it may be communicated as the control data described above.

One significant limitation in communicating APC control arises in the prior art when the number of status DATA bytes is large and/or the transmission rate of the status DATA bytes is slow. In this instance, the APC control byte(s) may arrive too late at the transmitting transceiver to have their intended effect. Consider the example of transceiver 10a and transceiver 10b. Suppose transceiver 10a is communicating a first DATA stream of either status DATA or control DATA (in the format shown in FIG. 1) to transceiver 10b. As transceiver 10b receives the first DATA stream, it senses the voltage level of the incoming signals. Assuming these levels are below acceptable standards, transceiver 10b must communicate an APC control signal to transceiver 10a so that transceiver 10a will increase its output power. As stated above, however, the transceivers can simultaneously communicate to one another. Thus, suppose that transceiver 10b, although having determined that an APC signal should be sent, is currently in the process of sending its own stream of status DATA to transceiver 10a. Because of the required format of FIG. 1, that is, only one type of DATA in an entire stream of DATA bytes, transceiver 10b must wait until the last of the current status DATA bytes have been sent before it can insert the APC control information (i.e., control DATA) into the next DATA stream. This condition is imposed because transceiver 10a expects to receive only one type of DATA bytes in a given stream (defined by an initial HEADER and ending with a TRAILER). Thus, transceiver 10b cannot immediately send the control DATA bytes. Indeed, if transceiver 10b immediately transmitted the control DATA bytes (before completing its second stream), transceiver 10a would wrongfully interpret the bytes as status DATA bytes, possibly causing an anomalous result.

Given the above, if the status DATA stream is lengthy (or slow), by time it is fully transmitted, and the APC control is transmitted in the next DATA stream, a significant delay occurs before transceiver 10a receives the APC control signal and adjusts its output power. If this delay is lengthy, the adjustment may occur at a time when communications have already been lost. Alternatively, by time transceiver 10a makes the adjustment, it may no longer be necessary, or may not be the proper amount.

One solution to this prior art problem is to include another medium (e.g., an additional channel) for communicating only the APC control information. Such a solution, however, significantly increases costs and complexity.

It is therefore an object of the present invention to provide an improved serial communication format and methodology for communicating control information in advance of completing the transmission of status information, wherein communication of both control and status information is along the same medium.

It is a further object of the present invention to provide such a format and methodology for efficiently controlling the automatic power control of a transceiver.

It is a further object of the present invention to provide such a format and methodology for discerning between control data and non-control data by transmitting an identification byte which is unique from all other data bytes.

It is a further object of the present invention to provide such a format and methodology for discerning between control data and non-control data by transmitting an identification byte having a selected bit set to a level opposite that of all other transmitted bytes.

It is a further object of the present invention to provide such a format and methodology for discerning between control data and non-control data by evaluating only selected bytes to determine if they are identification bytes.

Still other objects and advantages of the present invention will become apparent to those of ordinary skill in the art having reference to the following specification together with its drawings.

SUMMARY OF THE INVENTION

In one embodiment, the present invention includes a method including numerous steps for communicating serial information from a source to a destination. First, transmission is commenced of a serial stream of status information from the source to the destination, wherein the serial stream of status information has a beginning, an end, and a plurality of serially ordered status units between the beginning and end. Second, after the first step, a serial stream of control information is transmitted from the source to the destination, wherein the serial stream of control information has a beginning and an end. Various receiving steps then follow. First, the destination receives the beginning and a first portion of the plurality of status units of the serial stream of status information. Second, the destination receives the serial stream of control information. Third, the destination receives a second portion of the plurality of status units and the end of the serial stream of status information, wherein the status and control streams are communicated from the source to the destination along the same medium. Various alternative embodiments are also described.

BRIEF DESCRIPTION OF THE DRAWINGS

For a more complete understanding of the present invention, and the advantages thereof, reference is now made to the following descriptions taken in conjunction with the accompanying drawings, in which:

FIG. 3a illustrates a serial information format in accordance with the present invention having CONTROL data bytes interspersed throughout a single byte stream of STATUS data bytes;

FIG. 3b illustrates the most significant bit values for the individual bytes of the serial information format of FIG. 3a; and FIG. 4 illustrates an alternative embodiment of a serial information format having CONTROL data bytes interspersed at fixed intervals throughout a single byte stream of STATUS data bytes.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

Figure 1:
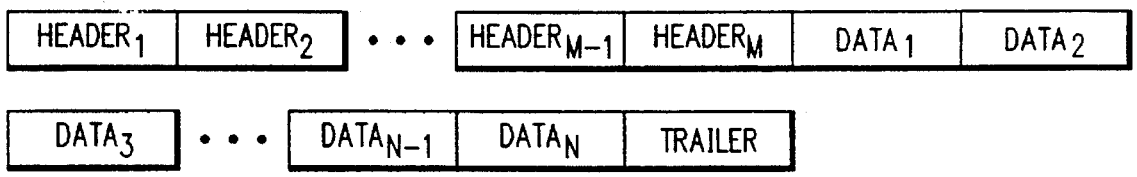
FIG. 1 illustrates a typical prior art format for communicating serial information between two devices.

As discussed above, FIG. 2 illustrates two transceivers $10a$ and $10b$ which are capable of communicating serial information between one another. Also as explained, the serial format of FIG. 1 is insufficient for supporting APC control in instances of lengthy or slow transmission of status DATA bytes. FIG. 3a, however, illustrates one embodiment of a serial information format in accordance with the present invention for solving the APC control problem. As described in greater detail below, the embodiment of FIG. 3a permits insertion of control data into the serial stream before completing transmission of the status data. This insertion allows combined communication of both control and status data along the same medium. For purposes of this document, the medium is defined to suggest a channel, frequency, conductor, or like means over which information is serially transmitted.

In particular, FIG. 3a illustrates a sequence of bytes commencing with a group 21 of HEADER bytes. Further, the sequence includes a stream of STATUS DATA bytes, beginning with a first byte, $STATUS_1$, and terminating with a last DATA byte, $STATUS_9$. This last STATUS-DATA byte is identified by the immediately following byte, TRAILER. Again, the TRAILER byte is shown by way of an exemplary embodiment. Thus, it is to be understood that other embodiments may use other mechanisms for defining the end of the STATUS bytes, such as the count technique described above. The sequence of FIG. 3a differs vastly from that of FIG. 1 in that FIG. 3a includes groups 22 and 24 of CONTROL DATA bytes interspersed throughout the STATUS DATA bytes. Each group of CONTROL DATA bytes has its own beginning and end. For example, group 22 includes CONTROL bytes $CONTROL_1$ and $CONTROL_2$, and group 24 includes bytes $CONTROL_1$ and $CONTROL_2$. Note that the subscripts used with the CONTROL bytes merely show ordering, and do not suggest that the contents of a CONTROL byte in one group are necessarily the same in a different group. Note also that, although not shown, each separate sequence of CONTROL DATA (e.g., group 22 or group 24) could also terminate with a TRAILER byte, thereby indicating the end of the embedded stream of CONTROL DATA.

Figure 2:
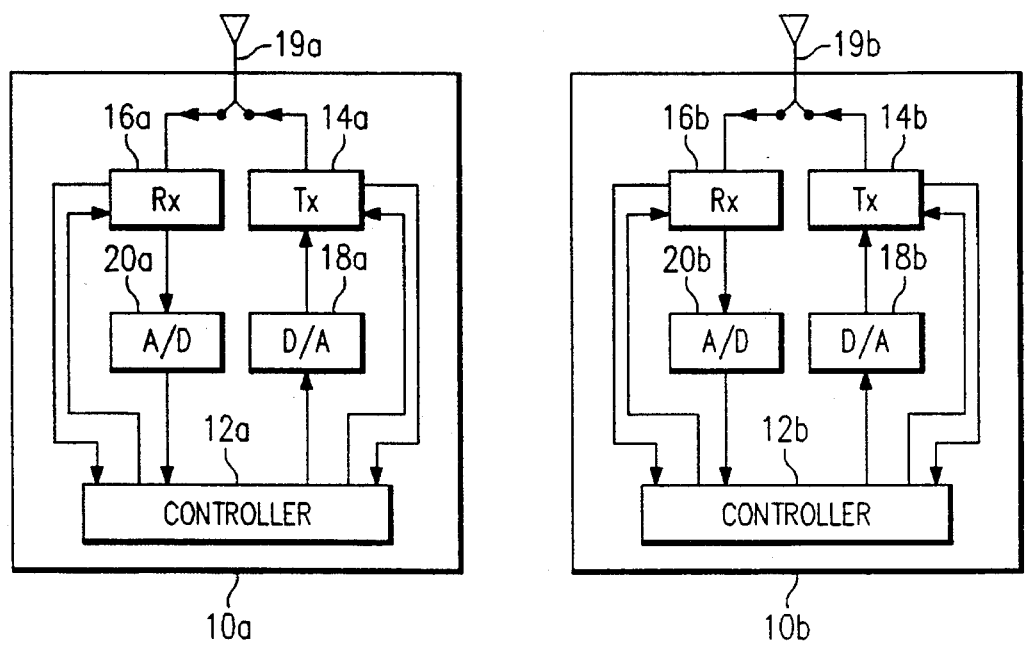
FIG. 2 illustrates two transceivers as an exemplary embodiment for communicating serial information.

Given the embodiment of FIG. 3a, consider the transmission of bytes between a first device to a second device (such as the transceivers of FIG. 2). Initially, the transmitting device sends group 21 of HEADER bytes. Next, the stream of STATUS DATA bytes, commencing with $STATUS_1$, is transmitted. Before reaching the end of the STATUS DATA bytes (e.g., identified by TRAILER), however, group 22 of CONTROL DATA bytes is transmitted. Thus, in this manner, and unlike the prior art, control information may be interspersed within status information. The transmission/receipt of the sequence of FIG. 3a continues until the end of the DATA bytes (e.g., TRAILER) is transmitted/received.

From FIG. 3a, it should be appreciated that the interspersing of CONTROL bytes with STATUS bytes solves the timing problems discussed above. Particularly, consider the APC example described above, but with the embodiment of FIG. 3a. Using this embodiment, transceiver $10b$, upon sensing an unacceptably low received voltage signal, may immediately insert APC control bytes (as CONTROL DATA) without having to wait for the end of the STATUS DATA byte transmission. As such, the APC control is timely received by transceiver $10a$, which then adjusts its amplifier output power accordingly.

Given the interspersion format of FIG. 3a, it is desirable to provide a technique for notifying the receiving device of when it is receiving CONTROL DATA as opposed to STATUS DATA. Without such a notification, the receiving device assumes the prior art scenario and, hence, treats all bytes following the initial group 21 of HEADER bytes as one type of DATA bytes until the last of the DATA bytes in a given stream is received. Under the present invention, this interpretation could cause erroneous results because additional CONTROL DATA bytes will be encountered at various locations throughout the single stream of STATUS DATA bytes. FIG. 3b illustrates one embodiment for providing a desired notification technique.

Specifically, FIG. 3b illustrates the most significant bit ("MSB") values for the bytes of the serial information format of FIG. 3a. For this illustration, the remaining bits of each byte are irrelevant and, thus, are designated as "z". As to the MSBs, note that the values for each of the leading CONTROL DATA bytes (i.e., $CONTROL_1$ of groups 22 and 24) are set to a first value (e.g., one), while the MSBs of all other DATA bytes are set to the opposite value (e.g., zero). Thus, the leading CONTROL DATA byte of each interposed sequence of such bytes acts as a control identification byte much like the header identification byte, $HEADER_1$. Note that the seven least significant bits of the CONTROl identification byte may include control information. Such control information may include the number of CONTROL bytes following the CONTROL identification byte in the embedded stream (e.g., group 22 or 24). Like the HEADER identification byte, this byte number may be directly encoded, or may provide an address to a table specifying the number of successive CONTROL bytes. Note further that the choice of a level equal to one for an indication is arbitrary; thus, a level of zero could indicate a CONTROL DATA identification byte while a level of one indicated a STATUS DATA identification byte.

Given the format of FIG. 3b, the device receiving the serial stream may evaluate the MSB of each incoming byte, and determine whether or not the byte is an identification byte. If the MSB equals one, therefore, the byte is interpreted as either a HEADER or CONTROL DATA identification byte. As such, the byte is further interpreted (by analyzing its remaining bits) to determine if it is a HEADER or CONTROL identification byte. As in the prior art, either encoded bits or a look-up table is consulted to determine how many HEADER or CONTROL bytes follow, and/or what functions should be performed in response to the byte. Once the subsequent HEADER or CONTROL bytes are received, an MSB equal to zero will indicate that status DATA bytes are being received while an MSB equal to one will indicate a CONTROL DATA identification byte. This process continues until the entire stream of STATUS DATA bytes has been received. Again, this last event may occur by way of a counter reaching a given level, or by encountering a TRAILER byte.

FIG. 4 illustrates an alternative serial information embodiment in accordance with the present invention. Note that only the initial letters "H" for HEADER, "S" for STATUS DATA, "C" for CONTROL DATA and "T" for TRAILER are used for simplifying the Figure. Like FIG. 3a, the format of FIG. 4 includes CONTROL DATA bytes interspersed throughout a single STATUS DATA byte stream. The embodiment of FIG. 4, however, permits CONTROL DATA bytes to occur at fixed intervals of the DATA bytes. For example, in FIG. 4, CONTROL DATA bytes occur, if at all, with only five STATUS DATA bytes spaced between the CONTROL DATA bytes. Particularly, FIG. 4 includes two groups 28 and 30 of CONTROL DATA bytes, and three groups 32, 34 and 36 of STATUS DATA bytes. As appreciated from the subscripts of the STATUS DATA bytes, the CONTROL DATA byte groups are separated by STATUS DATA bytes in multiples of five.

The fixed interval embodiment of FIG. 4 improves the efficiency of the embodiment of FIG. 3b. Specifically, the embodiment of FIG. 3b requires one bit of every byte to be allotted for indicating the type of the byte (i.e., either HEADER identification, CONTROL DATA identification or STATUS DATA identification). The example of FIG. 4, using a fixed interval interspersion of STATUS DATA bytes, permits the MSB of a majority of the STATUS DATA bytes to be used for purposes other than byte identification. This benefit is appreciated by the following review of the example of FIG. 4.

Under the embodiment of FIG. 4, the receiving device anticipates a given stream of bytes to begin with one or more HEADER bytes (i.e., group 26). As in the prior art, the first HEADER byte is an identification byte which, as set forth above, provides a basis for determining how many more HEADER bytes immediately follow. After receiving the initial group 26 of HEADER bytes, the receiving device need only evaluate the MSB of the byte following the next fixed interval. In this example, the fixed interval is five consecutive bytes. Thus, the receiving device receives group 32, consisting of five STATUS DATA bytes, and does not evaluate the MSBs of those five DATA bytes. A byte-by-byte count may accumulate to determine when this fixed interval has been received. After receiving this fixed interval of STATUS DATA bytes, the receiving device analyzes the MSB of the next byte. In the example of FIG. 4, this MSB indicates that a CONTROL DATA identification byte (i.e., $C_1$ of group 28) has been received. Again, the CONTROL DATA identification byte distinguishes itself and any subsequent CONTROL DATA bytes (i.e., $C_2$ and $C_3$ of group 38). These CONTROL bytes are thus used for their control information. Thereafter, at least five consecutive STATUS DATA bytes are anticipated. Therefore, the MSBs of STATUS DATA bytes $S_6$ though $S_{10}$ need not be indicative of the type of byte and, as such, can be used to indicate other information (i.e., they simply provide an additional bit of DATA information). Once five STATUS DATA bytes are received, the MSB of the next consecutive byte, $S_{11}$ in the example of FIG. 4, is analyzed. To indicate that it is a STATUS DATA byte, as opposed to a CONTROL DATA identification byte, this bit must be set appropriately (e.g., a logical zero to indicate a non-identification byte). Consequently, the MSBs of the next four STATUS DATA bytes following byte $S_{11}$ again are not analyzed for byte-identification and, hence, may be used for other purposes. Once STATUS DATA byte $S_{15}$ has been received, the MSB of the next consecutive byte (i.e., $C_1$ of group 30) is analyzed. In the current example, this MSB indicates that a CONTROL DATA identification byte has been received, and the process continues as described above. The detection process continues until the entire stream is received, as indicated by the receipt of a TRAILER byte, or by the completion of a total count of STATUS DATA bytes.

Having described its format and methodology, note that the present invention is preferably implemented primarily in software. For example, in FIG. 2, such software could be executed by controller 12a of transceiver 10a. Alternative software for use with alternative serial communicating devices should be readily apparent to one skilled in the art. Moreover, a mixed hardware and software, or solely hardware specific, implementation is also within the scope of the present invention. Still further, the embodiments of the present invention may be used between any serially communicating devices and, thus, are not necessarily limited to transceivers. In any case, from the above, it may be appreciated that the present invention provides numerous advantages over the prior art. For example, by interspersing CONTROL DATA bytes within a fixed stream of STATUS DATA bytes, CONTROL information may be serially transmitted between devices before an entire stream of STATUS DATA information has been sent. Moreover, the embodiments and advantages discussed herein demonstrate that while the present invention has been described in detail, various substitutions, modifications or alterations could be made to it by a person skilled in the art. One key example is that the invention has widespread application whenever it is desirable to serially communicate higher priority information before completion of a stream of lower priority information. The example discussed herein illustrates APC control information as requiring a priority higher than STATUS information due to the timing requirements imposed by the APC feature. Nonetheless, one skilled in the art may readily adapt the present invention to other instances where information of varying priorities may be interspersed without having to first complete transmission of an entire stream of lesser priority information. As another example, while the present invention has been discussed in terms of bytes, other data quantities are likewise included. For example, each quantity could be a nibble (i.e., 4 bits), a word (i.e., 16 bits) or a double-word (i.e., 32 bits). Data quantities other than multiples of four bits could be included as well. As yet another alternative, while the MSB was designated as a distinguishing bit in FIGS. 3a–4, note that a different selected bit in the data quantity (e.g., least significant bit) could be chosen as an alternative. Thus, each of these alternatives, as well as others readily apparent, are intended within inventive scope as defined by the following claims.

What is claimed is:

1. A method of communicating serial information from a source to a destination along a medium, comprising the steps of:

commencing transmission of a serial stream of status information from said source to said destination, said serial stream of status information having an arbitrary number of status units including a first status unit and a last status unit and a plurality of serially ordered status units therebetween, wherein said commencing step comprises sending said first status unit and a first portion of said plurality of status units;

inserting, after said commencing step, an entire serial stream of control information from said source to said destination, said entire serial stream of control information having a predetermined number of control units, beginning with a first control unit and ending with a last control unit;

transmitting, after said inserting step, said entire serial stream of control information from said source to said destination;

first, receiving by said destination said first status unit and said first portion of said plurality of status units of said serial stream of status information;

second, detecting by said destination receipt of said entire serial stream of control information after said first receiving step; and third, receiving a second portion of said plurality of status units and said last status unit of said serial stream of status information by said destination after said detecting step, wherein said status and control streams are communicated from said source to said destination along the same medium and such that said entire serial stream of control information is interspersed between said first status unit and said last status unit.

2. The method of claim 1 wherein said source and destination comprise transceivers, each of said transceivers having a controllable power output, and wherein said control information comprises automatic power control information for controlling the power output of said destination transceiver.

3. The method of claim 1 and further comprising the steps of:
transmitting a serial stream of header information from said source to said destination, said serial stream of header information having a first unit and last unit; and
receiving said serial stream of header information by said destination before said first receiving step.

4. The method of claim 1 wherein said control information has a higher priority than said status information.

5. The method of claim 1 wherein each of said status units and said control units comprises a same number of plurality of bits, and wherein said detecting step comprises detecting said first control unit by detecting a bit at a predetermined bit location in said first control unit having a unique value in comparison to the value at said predetermined bit location for each of said status and control units other than said first control unit.

6. A method of communicating information serially from a transmitter to a receiver, comprising the steps of:
commencing transmission of a first sequence of data units each having a plurality of bits, wherein said first sequence has an arbitrary number of data units including a beginning data unit and an end data unit, wherein said commencing step comprises sending said beginning data unit and a first portion of said first sequence of data units; and
transmitting a second sequence having a predetermined number of data units after said beginning data unit and said first portion of said first sequence before said end data unit of said first sequence such that said second sequence of data units is interspersed between said beginning and end data units of said first sequence of data units, wherein each of said second sequence of data units comprises a plurality of bits;

wherein said second sequence commences with an initial data unit having a predetermined bit location storing a predetermined value different than the value data units of said first sequence, thereby identifying said data unit as said initial data unit; and wherein said initial data unit includes data indicating the quantity for the predetermined number of data units in said second sequence.

7. The method of claim 6 wherein each of said data units comprises eight bits, wherein said predetermined bit location is the most significant bit of a data unit.

8. The method of claim 6 and further comprising the step of transmitting a second portion of said first sequence of data units and said end data unit of said first sequence of data units after said step of transmitting said second sequence.

9. The method of claim 6 wherein said initial data unit of said second sequence comprises a first initial data unit, and further comprising the steps of:
transmitting a second portion of said data units of said first sequence after said step of transmitting said second sequence of data units;

transmitting a third sequence of data units after said step of transmitting additional data units and before transmitting said end data unit of said first sequence, wherein each of said third sequence of data units comprise a plurality of bits, and wherein said third sequence commences with a second initial data unit having said predetermined value stored at said predetermined bit location of said second initial data unit, thereby identifying said second initial data unit; and transmitting a third portion of said first sequence of data units and said end data unit of said first sequence of data units after said step of transmitting said third sequence.

10. A method of communicating status data and control data in a serial stream between a first and second transceiver, wherein each of said transceivers comprises an adjustable amplifier, comprising the steps of:
commencing transmission of a serial stream of said status data from said first transceiver to said second transceiver, wherein said status data comprises an arbitrary number of data units including a beginning data unit, intermediate data units and an ending data unit, wherein said commencing step comprises transmitting said beginning data unit and a first number of said intermediate data units;

inserting said control data into said serial stream, wherein said control data comprises an initial data unit transmitted after said beginning data unit and said first number of said intermediate data units and before said ending data unit such that said control data is interspersed between said beginning data unit and said ending data unit; and transmitting said serial stream from said first transceiver to said second transceiver, wherein said amplifier of said second transceiver is adjusted in response to said control data received by said second transceiver.

* * * * *

UNITED STATES PATENT AND TRADEMARK OFFICE
CERTIFICATE OF CORRECTION

PATENT NO. : 5,553,308
DATED : September 3, 1996
INVENTOR(S) : Nelson J. Vink

It is certified that error appears in the above-indentified patent and that said Letters Patent is hereby corrected as shown below:

Col. 5, ln. 53, delete "STATUS-DATA", insert --STATUS DATA--.

Col. 10, ln. 9, between "value" and "data", insert --stored at said predetermined bit location for each of said--

Signed and Sealed this

Seventh Day of January, 1997

Attest:

BRUCE LEHMAN

Attesting Officer       Commissioner of Patents and Trademarks